April 21, 1959
F. H. LONDON
2,883,555
THICKNESS MEASURING APPARATUS WITH COMPENSATION
FOR ATMOSPHERIC CONDITIONS
Filed May 28, 1956
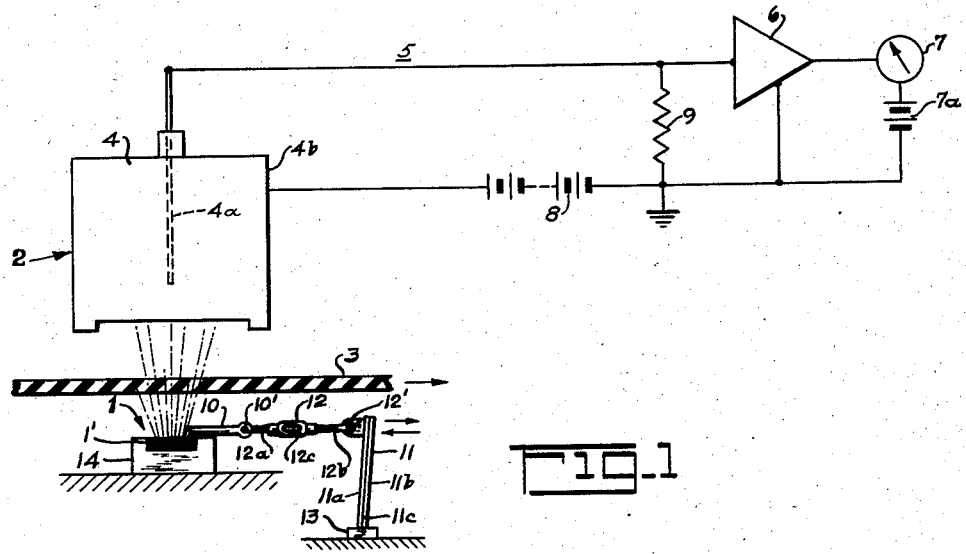
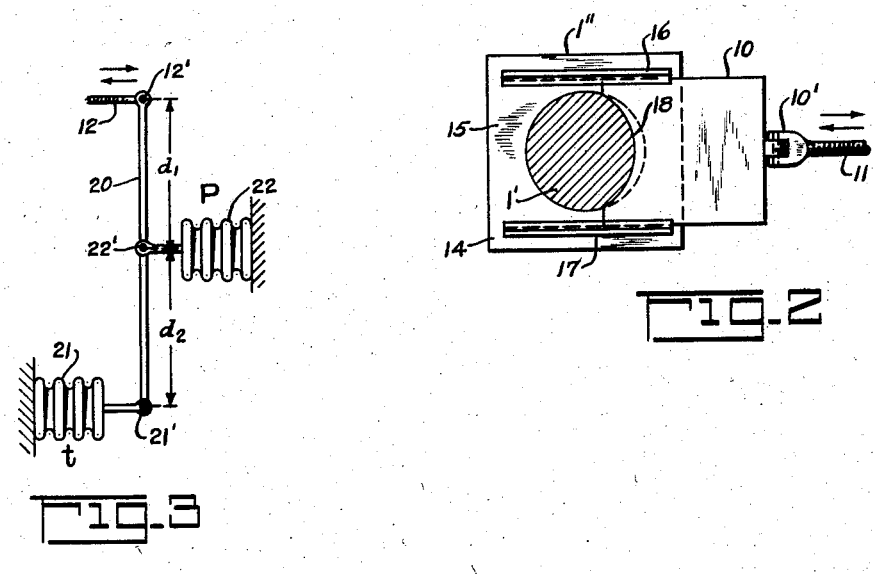
INVENTOR.
FRED H. LONDON
BY
HIS ATTORNEY

United States Patent Office 2,883,555
Patented Apr. 21, 1959

2,883,555

THICKNESS MEASURING APPARATUS WITH COMPENSATION FOR ATMOSPHERIC CONDITIONS

Fred H. London, New York, N.Y., assignor to Curtiss-Wright Corporation, a corporation of Delaware Application May 28, 1956, Serial No. 587,506

8 Claims. (Cl. 250—105)

This invention relates to radiation measuring apparatus of the type commonly used for non-contact measurement of thickness or density of continuously produced strip material, and has for its principal object an improved and precise radiation measuring apparatus of the aforesaid character that is operative automatically to compensate errors due to variations in ambient atmospheric conditions, such as temperature and barometric pressure.

The thickness or density of continuously produced strip materials such as paper, plastics, metals, etc., has been indicated and/or controlled by radiation measuring apparatus wherein the material to be measured is subjected to penetrative radiation, such as from a source of beta or gamma radiation, and the unabsorbed radiation from the material is detected and measured for determining the thickness or density at the point of measurement. Apparatus of this character has been developed to such a high degree of accuracy that differences in radiation absorption incident to change in mass of the gap medium between the source and detector (which may be due to variations in ambient temperature or barometric pressure) cause material errors in measurement. For example, if it be assumed that the gap medium is air and that ambient temperature is at predetermined normal or reference value and that barometric pressure is higher than normal, then the density of the air gap, i.e. its mass, will be slightly greater than normal, thereby resulting in increased radiation absorption in the air gap with correspondingly less radiation received at the detector. Accordingly, the measurement of the material will be erroneous to the extent that greater thickness or density than for the actual case will be indicated. The same general result obtains where the ambient temperature is lower than normal. Conversely, a decrease in mass of the air gap results in increased radiation received at the detector, thereby falsely indicating that the material has less thickness or density than is actually the case.

In accordance with the present invention, variation in gap medium absorption due to ambient atmospheric conditions is compensated by means responsive to variations in the aforesaid conditions for automatically stabilizing the effective radiation through the gap medium. In a specific embodiment of the invention, the atmospheric condition responsive means is effective to control the amount of radiant flux received thereby to compensate for variation in mass of the gap medium.

The invention will be more fully set forth in the following description referring to the accompanying drawing, and the features of novelty will be pointed out with particularity in the claims annexed to and forming a part of this specification.

Referring to the drawing, Fig. 1 is a partly diagrammatic and schematic illustration of a radiation measuring system embodying the present invention having means for compensating error due to change in temperature of the gap medium; Fig. 2 is an enlarged detailed top plan view of the radiation source and radiation flux control means illustrated in Fig. 1; and Fig. 3 is a modified form of the system shown in Fig. 1 for temperature and pressure compensation.

The radiation measuring system schematically illustrated in Fig. 1 comprises a source of radiation generally indicated at 1, and a radiation detector 2 of suitable type spaced from the source as indicated, by an air gap. Within the air gap is disposed material to be measured in respect to thickness or density, as the case may be. In the present instance the material 3, which may be paper, plastics, etc., is of strip form arranged as it is produced continuously to move through the gap. In this type of system the radiation from the source 1, which may be a radioactive isotope 1' emitting beta rays, penetrates the strip material where it is partially absorbed, depending on the mass of the material, and the unabsorbed radiation enters the detector 2.

By way of example the detector 2 may comprise an ionization chamber 4 of well-known type having a probe electrode 4a and a conducting wall 4b forming the other or positive electrode. The electrodes are connected in conventional manner by circuitry 5 to an amplifier 6 which energizes a calibrated indicator 7. A suitable D.C. potential bucks out the quiescent D.C. output potential of amplifier 6, so that the deflection of indicator 7 is related directly to change in output potential with respect to the quiescent potential, rather than to ground potential, whereby its sensitivity is improved. A high D.C. potential indicated at 8 is impressed on the wall electrode 4b and is connected as illustrated to a grounded resistor 9 which completes an external circuit with the electrode 4a. The lower wall of the ionization chamber 4 may be provided with suitable sealed apertures (not shown) through which radiation enters the chamber causing ionization with resulting current flow through the external circuit including the resistor 9 according to the intensity of radiation entering the chamber. Thus, the amplifier 6 is responsive to the potential difference across resistor 9 and, since this potential difference is proportional to the radiation received by the detector, the indicator 7 can be calibrated in terms thereof.

Although a simple indicating system is illustrated, it should be understood that the signal from the amplifier 6 can be used either to indicate the departure of the thickness or density of the material 3 from a predetermined value or may also by well-known means control a recorder, as well as means governing the production of said material so as to correct the error in thickness or density.

In systems heretofore used, the amount of radiant flux received in the detector is generally fixed for a given operation at a predetermined magnitude so that when material of standard thickness or density is interposed in the gap, the indicator 7 reads zero. Accordingly any deviation from the standard in either direction results in a signal of corresponding sense at the indicator 7. It should be understood that the arrangement of the radiation source 1, detector 2 and material 3 may be varied according to the method preferred; for example, instead of being at opposite sides of the material 3 as shown the source 1 and detector 2 may be at the same side of the material and positioned so that unabsorbed radiation is reflected or "back-scattered" into the detector.

As previously stated, the gap medium (air in the present instance) may have different absorption capacity under varying ambient atmospheric conditions, assuming that the air gap is fixed, and that the radiation is constant. That is, the amount of unabsorbed radiation flux entering the detector 2 depends on the mass of the gap medium as well as the mass of the material being measured. In accordance with the present invention and in the preferred manner, a movable radiation shield or shutter 10 is positioned generally over the source of radiation 1. The shutter is made of a material suitable for diverting a portion of the radiant flux emitted or transmitted as by reflection, absorption or refraction. The amount of diverted flux varies depending on the shutter position. A means responsive to atmospheric conditions is arranged to position the shutter so as to compensate for the measurement error due to change in mass of the gap medium.

To this end there is shown in Fig. 1 a device 11 of well-known bimetal type that is responsive to temperature variations so as bodily to move shutter 10 relative to source 1 by means of an interconnecting link or lever 12. The device 11 is fixed at one end as at 13 and its opposite free end is pivotally interconnected with an end of lever 12 at 12'. An end 10' of the shutter 10 is pivotally interconnected with the other end of lever 12, so that with motion of the device 11 motion is imparted to shutter 10.

Device 11 comprises two metallic strips 11a and 11b having unequal coefficients of thermal expansion. The strips are joined together along the common surface 11c. Specifically the coefficient of strip 11a is lower than the coefficient of strip 11b, so that with an increase of temperature the device 11 warps in a counter-clockwise direction, thereby imparting a leftward movement to shutter 10. Shutter 10 is caused to divert a portion of the radiant beam greater than that diverted at normal ambient temperature. A greater diversion is proper to diminish the radiation received at detector 2, which in the absence of temperature compensation would be too great as pointed out hereinabove. Conversely with a decrease in ambient temperature the device 11 warps in a clockwise direction, thereby imparting a rightward movement to the shutter 10 and increasing the radiation received in detector 2 to the standard amount.

Lever 12 comprises two threaded end-members 12a and 12b which are threadably secured to a central member 12c, a turnbuckle, provided to permit adjustment of the effective lengths of members 12a and 12b with reference to the operating characteristics of device 11, so that movement of the shutter is in proper relation to temperature changes.

Referring to Fig. 2, the source 1 comprises a base 14 which has a recessed surface 15 in which the isotope 1' is disposed. The shutter 10 is of generally rectangular sheet form. It is constrained to lateral sliding movement by means of guides 16 and 17 which are secured to the surface 15 and engage a pair of parallel sides of the rectangle defining the shutter. An end 18 of the shutter which is opposite to the end 10' lies generally over the isotope 1' and is of curved shape so as to provide still further correlation of the diversion of radiation with the characteristics of the device 11. The curved shape serves for the further purpose of substantially preserving the general geometry of the apparatus and therefore its calibration irrespective of shutter position.

If it is desired to still further perfect the preservation of the general geometry, an opposite shutter of similar construction to shutter 10 may be included in symmetrical arrangement and disposition thereto with respect to the isotope 1'. The shutters may be caused to converge or diverge from isotope 1' by suitable simultaneous actuating means responsive to movement of device 11.

Fig. 3 illustrates in simple form an arrangement of temperature and pressure compensating means for controlling the radiation source. In this arrangement one end of link 13 is pivotally interconnected with one end of another suitable linkage or lever 20 at 13'. Lever 20 is actuated jointly by suitable temperature and pressure responsive devices indicated at 21 and 22 respectively. The bellows 21 which contains a suitable liquid in both liquid and vapor phases is temperature responsive and is connected to the lever at pivot 21', and the bellows 22 which is evacuated so as to be responsive to barometric pressure is connected to the floating pivot or fulcrum 22' of the lever 20. The lever arms $d_1$ and $d_2$ are selected with reference to the operating characteristics of the two bellows so that movement of the shutter is in proper relation to temperature and/or pressure changes.

It will therefore be seen that in practicing my invention as illustrated in Fig. 3 the radiation flux may be controlled according to the joint effects of ambient temperature and barometric pressure changes so as to compensate for change in mass of the gap medium due to the aforesaid conditions.

As used herein insofar as respects the response of detector 2, radiation, intensity of radiation or effective radiation is a measure of that quality of the radiant energy which is effective in causing ionization in the radiaton detector 2, and flux or radiant flux is a measure of the radiant energy emitted by the source 1 or transmitted to or received by detector 2. Radiation, intensity of radiation or effective radiation, therefore, depends on the flux actually received by detector 2 as well as on the distance separating the detector 2 from the source 1. On the other hand flux is independent of the separating distance.

It should be understood that this invention is not limited to specific details of construction and arrangement thereof herein illustrated, and that changes and modifications may occur to one skilled in the art without departing from the spirit of the invention.

What is claimed is:

1. Apparatus for measuring the thickness or density of continuously produced strip material comprising a source of radiant energy disposed so that the material to be measured is subject to penetrative radiation from said source, a radiation detector disposed at a substantially fixed mean distance from said source and in operative relation to said material and said source for receiving radiation unabsorbed by said material, adjustable means for controlling the amount of radiant flux received by said detector, and means responsive to variations in an atmospheric condition for adjusting said control means thereby to compensate for variation in gap medium absorption due to change in mass of the gap medium between said source and detector.

2. Thickness measuring apparatus as specified in claim 1 wherein the last-named means comprises means subject to contraction and expansion in response to ambient temperature variation.

3. Thickness measuring apparatus as specified in claim 1 wherein the last named means comprises means subject to contraction and expansion in response to atmospheric pressure variation.

4. Measuring apparatus as specified in claim 1 wherein the last-named means comprises two devices functioning jointly to control the amount of transmitted radiant flux, said devices comprising an ambient temperature responsive device and a barometric pressure responsive device.

5. Thickness measuring apparatus as specified in claim 1 wherein the control means is effective to decrease the amount of radiant flux entering the gap from the source in accordance with increase in ambient temperature and vice versa.

6. Thickness measuring apparatus as specified in claim 1 wherein the control means comprises radiation shutter means positioned in the radiant beam emanating from the source by the atmospheric condition responsive means so as to control the amount of flux received by the detector.

7. Apparatus for measuring the thickness or density of continuously produced strip material comprising a source element for producing radiant energy disposed so that the material to be measured is subject to penetrative radiation from said source, a radiation detector element disposed in operative relation to said material and said source element for receiving radiation unabsorbed by said material, radiation shutter means interposed of said elements for diverting a portion of the radiant flux therebetween, and means responsive to variations in an atmospheric condition for causing relative movement of said shutter and one of said elements thereby to compensate for variation in gap medium absorption due to change in mass of the gap medium between said source and detector.

8. Apparatus for measuring the thickness or density of continuously produced strip material comprising a source of radiant energy disposed so that the material to be measured is subject to penetrative radiation from said source, a radiation detector disposed in operative relation to said material and source for receiving radiation unabsorbed by said material, radiation shutter means interposed between said source and detector for diverting a portion of the radiant flux therebetween, a bimetallic element warpable responsive to change in ambient temperature, and means responsive to warping of said bimetallic element for positioning said shutter means thereby to compensate for variation in gap medium absorption due to change in mass of the gap medium between said source and detector with change in ambient temperature.

References Cited in the file of this patent
UNITED STATES PATENTS

| | | |
|---|---|---|
| 2,467,812 | Clapp | Apr. 19, 1949 |
| 2,730,626 | Varney | Jan. 10, 1956 |